US010647567B2

(12) United States Patent
Robe et al.

(10) Patent No.: US 10,647,567 B2
(45) Date of Patent: May 12, 2020

(54) TESTING OR FILLING ADAPTER EQUIPPED WITH A SAFETY DEVICE

(71) Applicant: Fives Filling & Sealing, Le Bignon (FR)

(72) Inventors: Eric Robe, Le Bignon (FR); Guillaume Ory, Le Bignon (FR); Nicolas Libeaut, Nantes (FR)

(73) Assignee: Fives Filling & Sealing, Le Bignon (FR)

( * ) Notice: Subject to any disclaimer, the term of this patent is extended or adjusted under 35 U.S.C. 154(b) by 47 days.

(21) Appl. No.: 16/090,408

(22) PCT Filed: Mar. 30, 2017

(86) PCT No.: PCT/EP2017/057631
§ 371 (c)(1),
(2) Date: Oct. 1, 2018

(87) PCT Pub. No.: WO2017/167933
PCT Pub. Date: Oct. 5, 2017

(65) Prior Publication Data

US 2019/0119097 A1 Apr. 25, 2019

(30) Foreign Application Priority Data

Mar. 30, 2016 (FR) ..................................... 16 52754

(51) Int. Cl.
*B67D 7/52* (2010.01)
*F16L 37/00* (2006.01)
(Continued)

(52) U.S. Cl.
CPC ................ *B67D 7/52* (2013.01); *B67D 7/02* (2013.01); *B67D 7/42* (2013.01); *B67D 7/0294* (2013.01); *B67D 7/423* (2013.01)

(58) Field of Classification Search
CPC ... B67D 7/52; B67D 7/02; B67D 7/42; B67D 7/0294; B67D 7/423; F16K 1/123;
(Continued)

(56) References Cited

U.S. PATENT DOCUMENTS 1,490,805 A * 4/1924 Divekey ................ E03D 11/16 285/13
4,638,842 A * 1/1987 Hawley .................... B67D 7/42 141/302
(Continued)

FOREIGN PATENT DOCUMENTS

EP 0011155 A1 5/1980
FR 2863264 A1 * 6/2005 ........... F16L 19/083
(Continued)

OTHER PUBLICATIONS

FR-2911593-A1 English Translation of Specification (Year: 2008).*
(Continued)

*Primary Examiner* — Marina A Tietjen
*Assistant Examiner* — Stephanie A Shrieves
(74) *Attorney, Agent, or Firm* — Knobbe, Martens, Olson & Bear, LLP

(57) ABSTRACT

A testing or filling adapter (1) for a container to be filled with fluid, composed of a body (10), an attachment module (3), and a coupling system (30) having a coupled position, in which a sealed connection is established between the body and the attachment module, and an uncoupled position. The body includes a feed module (2) that comprises a plurality of conduits that include at least one fluid conduit (221) and is equipped with a safety valve (5) that can be moved between an open configuration and a closed configuration and is connected to an element mirror (51) having a first configuration in which the safety valve is in the open configuration and a second configuration in which the safety
(Continued)

valve is in the closed configuration. The filling adapter further comprises a safety device (6) that cooperates with the coupling system, with it being possible to move said safety device between a locked position, in which the safety device locks the coupling system in the coupled position, and an unlocked position, in which the safety device enables the coupling system to be moved into the uncoupled position. The safety device cooperates with the mirror element so as to enable the mirror element to be in its first configuration when the safety device is in the locked position, and to force the mirror element to be in its second configuration when the safety device is moved from its locked position to its unlocked position.

9 Claims, 4 Drawing Sheets

(51) Int. Cl.

| | |
|---|---|
| ***B67D 7/02*** | (2010.01) |
| ***B67D 7/42*** | (2010.01) |
| ***F16L 37/124*** | (2006.01) |
| ***F16L 37/24*** | (2006.01) |

(58) Field of Classification Search

CPC ... F16K 1/38; F16K 1/12; B60K 15/04; B64F 1/28; B63B 27/34; F16L 37/24; F16L 37/00; F16L 37/248; F16L 37/10; F16L 37/252; F16L 37/244; B65D 25/48; B05C 17/00506; B05C 17/00513

USPC ........ 141/383, 384, 385, 386, 392; 285/401, 285/376, 314; 222/567, 568

See application file for complete search history.

(56) References Cited

U.S. PATENT DOCUMENTS

| | | | | |
|---|---|---|---|---|
| 6,799,614 B1 * | 10/2004 | Smith | ...................... | B67D 7/42 141/287 |
| 2010/0000629 A1 * | 1/2010 | Bentivoglio | ............. | B67D 7/32 141/192 |
| 2017/0137276 A1 * | 5/2017 | Achatz | ..................... | B67D 7/42 |

FOREIGN PATENT DOCUMENTS

| | | | | |
|---|---|---|---|---|
| FR | 2911563 A1 * | 7/2008 | ................ | B60S 1/52 |
| FR | 2911593 A1 | 7/2008 | | |
| WO | 2004/069734 A1 | 8/2004 | | |
| WO | WO-2004069734 A1 * | 8/2004 | .......... | F01P 11/0204 |

OTHER PUBLICATIONS

FR-2863264-A1 English Translation of Specification (Year: 2005).*

International Search Report for Application No. PCT/EP2017/057631 dated May 8, 2017 in 4 pages.

* cited by examiner

TESTING OR FILLING ADAPTER EQUIPPED WITH A SAFETY DEVICE

CROSS-REFERENCE TO RELATED APPLICATIONS

This application is the U.S. National Phase under 35. U.S.C. § 371 of International Application PCT/EP2017/057631, filed Mar. 30, 2017, which claims priority to French Patent Application No. 1652754, filed Mar. 30, 2016. The disclosures of the above-described applications are hereby incorporated by reference in their entirety.

FIELD OF THE INVENTION

The present invention relates to a testing or filling adapter for transferring one or more fluids from a testing or filling machine to a fluid circuit. It finds application particularly in the transfer of fluids such as coolant, brake fluid, or air conditioning fluid for the corresponding circuit of a vehicle during the testing or filling of such a circuit, for example on an automotive assembly line, or in the energy sector for filling heat pumps or electric radiators with fluid. The fluid or fluids can be mixtures of fluids, as in the case of a coolant of the water/glycol type, or of a mixture obtained by successive injection of a first fluid such as a polyalkylene glycol-type oil (PAG) followed by a second fluid such as a refrigerant like tetrafluoroethane (R134A). In automobile lines, fluids must always be available to fill the various circuits of vehicles being assembled on the production line. The adapter is a specific tool that connects to the fluid circuit in a sealed manner, in most cases by means of a temporary, automatic, or manual connection, integrating hydraulic and pneumatic elements to ensure a fluid connection between the filling unit and the circuit to be filled. The operator uses the adapter when filling or testing each circuit of the vehicle: it must be robust, lightweight, and ergonomic; despite this, it remains a vulnerable tool, and it must be repaired or exchanged very quickly without stopping the production line and without polluting the work area during the repair or exchange thereof.

BACKGROUND OF THE INVENTION

At present, the adapters with which assembly lines are equipped are linked to a long sheath connecting the adapter being manipulated by the operator to the testing or filling machine. This sheath contains a bundle of fluid conduits and electrical cables. Alternatively, these bundles of fluid conduits and cables are simply held together by collars. The sheath is connected to the reservoir of the testing or filling machine by a system of fluid connectors.

The adapters comprise two main sub-assemblies: a feed module and an attachment module. The feed module is connected in the upper part to the sheath and supports the control commands. The attachment module is connected at the bottom to the feed module, for example by three or four long screws. A sub-module containing axial valves is trapped between the feed module and the attachment module. This mechanism is fixed to the spout of the reservoir or fluid circuit to be filled and may differ depending on sizes and the connection system.

The operator intervenes regularly in the attachment module during maintenance of the axial valves, a change of the attachment mechanism during a change in the spout type of the fluid circuit, or following a failure of the attachment module, or simple cleaning. These interventions are delicate, because the separation of the modules causes the separation of all of the parts making up the attachment module more than thirty parts with a risk of loss of gaskets or internal springs, whereas there is no need to completely dismantle this module according to the intervention.

Once the intervention is complete, reassembly requires putting each part in place. Although some of these parts are equipped with indicators, the operation takes time and requires vigilance and dexterity. As a precision tool, it is not recommended that the adapter be clamped in a vice, which does not facilitate the reassembly of the adapter.

SUMMARY OF THE INVENTION

It is therefore an object of the invention to enable a fast and secure connection between the attachment module and the feed module. It is another object to ensure the fluid sealing of the fluid conduits when the connection is separated.

For this purpose, the invention proposes a testing or filling adapter for a reservoir or downstream pipe to be filled with fluid, particularly for an initial filling on an automobile production line, said filling adapter comprising a body, an attachment module for attaching the adapter to the reservoir or downstream pipe to be filled, and a coupling system having a coupled position, in which a tight connection is established between the body and the attachment module, and an uncoupled position, in which the attachment module can be separated from the body, with the body including a supply module comprising a plurality of conduits that include at least one fluid conduit, said fluid conduit being equipped with a safety valve that can be moved between an open configuration in which the safety valve permits the circulation of fluid in the fluid conduit and a closed configuration in which the safety valve prevents the circulation of fluid in the fluid conduit, with the safety valve being connected to a mirror element, said mirror element having a first configuration in which the safety valve is in the open configuration and a second configuration in which the safety valve is in the closed configuration, with the filling adapter comprising at least one safety device that cooperates with the coupling system, said safety device being movable between a locked position, in which the safety device locks the coupling system in the coupled position, and an unlocked position, in which the safety device allows the displacement of the coupling system to the uncoupled position, with the safety device also cooperating with the mirror element so as to enable the mirror element to be in its first configuration when the safety device is in the locked position, and forcing the mirror element to be in its second configuration when the safety device is moved from its locked position to its unlocked position.

According to particular embodiments of the invention, the adapter further comprises one or more of the following features, either alone or in any technically possible combination(s):

- the mirror element is designed to lock the safety device in the locked position when in its first configuration and to enable the safety device to be moved from its locked position to its unlocked position when it is in its second configuration;
- the adapter comprises a device for returning the mirror element to its second configuration, and the safety device is designed to maintain the mirror element in its first configuration when in the locked position;

the safety device comprises a cover that is designed to block user access to the coupling system when the safety device is in the locked position;

the cover is an openwork ring pivoting on one or other of the body and the attachment module and preventing user access to the coupling system when the safety device is in the locked position;

the safety device comprises a lock pin that is secured to the cover, with the mirror element being designed to lock the lock pin in order to keep the safety device in the locked position when the safety valve is open;

the coupling system comprises screws secured to the attachment module and holes arranged in the form of keyholes in the body, with each screw comprising a threaded rod that is engaged in part in the attachment module and a head extending out of the attachment module, and with each hole comprising a wide portion having a section that is greater than the section of the screw heads and a narrow portion having a section that is between the section of the screw heads and the section of the screw rods;

the coupling system comprises a ring that is disposed on the body or on the attachment module, and a screw thread that is disposed on the opposing module, with the ring having an internal thread that is designed to cooperate with the screw thread in order to enable the ring to be screwed onto the screw thread; and the mirror element comprises an actuator, particularly a quarter-turn actuator, for the safety valve that can be moved between a first, open position of the safety valve and a second, closed position of the safety valve, with the mirror element being in its first configuration when the actuator is in its first position and in its second position when the actuator is in its closed position.

BRIEF DESCRIPTION OF THE DRAWINGS

Other features and advantages of the invention will become apparent from the description that follows, which is provided solely by way of example and not limitative, with reference to the following appended figures.

DETAILED DESCRIPTION OF THE PREFERRED EMBODIMENTS

In the following, several exemplary embodiments of the invention will be described in detail with reference to the figures.

The exemplary embodiments and implementations of the invention presented in the present description relate to the automotive or energy sector but are in no way limitative, since the invention applies to all sectors requiring testing and/or filling a fluid circuit through the transfer of fluids, especially in the energy sector for the filling of heat pumps.

Figure 1:
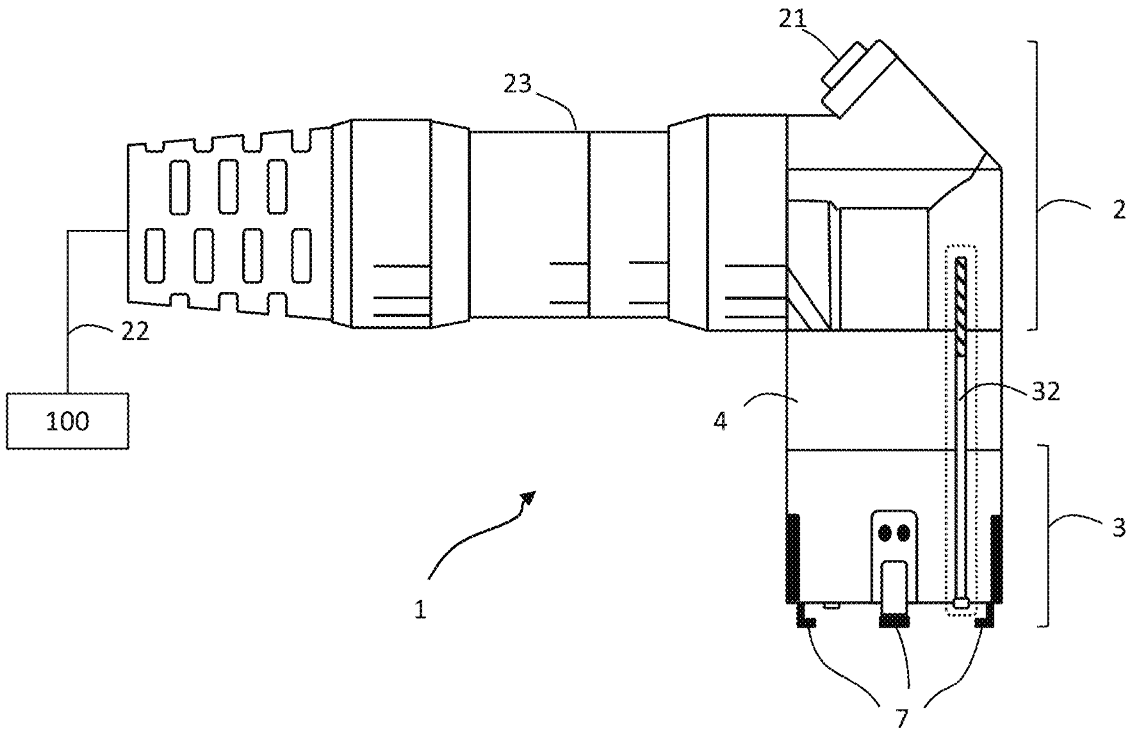
FIG. 1 is a schematic representation of a filling adapter according to the prior art.

According to the prior art, FIG. 1 shows a filling adapter 1 composed of a feed module 2, a coupling module 3, and a valve support 4. The feed module 2 is connected to a fluid filling machine 100 by a sheath 22. The feed module 2 comprises fluid and electrical conduits and connections as well as controls 21 for controlling the testing and filling operations. A handle 23 is formed by a portion of the feed module 2 or by an additional appendage.

The attachment module 3 is the part that is attached to the reservoir or the neck of the fluid circuit to be filled. It consists of a mechanical attachment mechanism, usually using gripping claws 7 and having, depending on the reservoirs and the type of fluid to be filled, a sealing system (not shown). The attachment module 3 can be controlled pneumatically or electrically. A plurality of parts and joints make up the attachment modules 3. A valve support 4 is generally sandwiched between the attachment module 3 and the feed module 2. Depending on the design, this valve support 4 can be integrated into the feed module 2 or into the attachment module 3. The support 4 comprises at least one valve 41 that is controlled by a pneumatic or electrical control.

The attachment module 3 and the valve support 4 are connected to the feed module 2 by three to four long screws 32. These pass through the elements and are screwed into the body of the feed module 2 and enable all of the mechanical parts to be kept in place and the seals between the modules and parts to be compressed, thus ensuring a tight connection between the modules. With this attachment system, the disassembly of the attachment module results in the disassembly of the valve support, even if the latter is not necessary.

Figure 2:
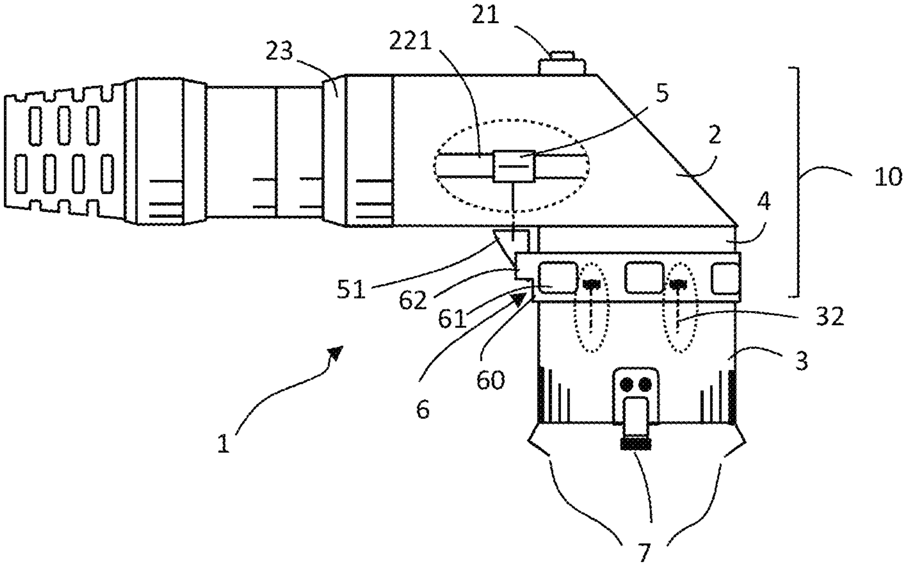
FIG. 2 is a side elevation of a filling adapter according to a first embodiment of the invention, with the filling adapter being in the coupled and locked position.
Figure 3:
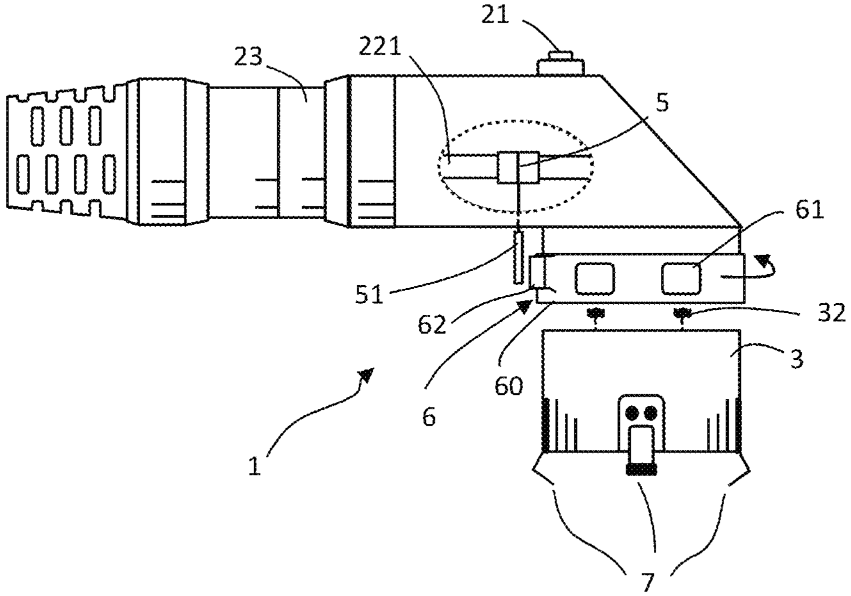
FIG. 3 shows a view similar to that of FIG. 2, but with the filling adapter being in the unlocked and uncoupled position.

With reference to FIGS. 2 and 3, the adapter 1 according to the first embodiment of the invention comprises: a body 10, including a feed module 2 and a valve support 4, an attachment module 3, and a system 30 for coupling the attachment module 3 with the body 10.

The feed module 2 comprises a safety valve 5 on at least one of the fluid conduits 221 passing through the feed module 2. This safety valve 5 comprises a stopper that can be moved in relation to the fluid conduit 221 between a closed position of the valve 5, in which the stopper prevents the circulation of fluid in the fluid conduit 221, and an open position of the valve 5, in which the stopper permits the circulation of fluid in the fluid conduit 221. For this purpose, the stopper is preferably mounted so as to swivel about an axis in relation to the fluid conduit 221 so that it can be moved between its open and closed positions of the valve 5. Therefore, the valve 5 is advantageously a gate- or slide-type valve. Alternatively, the safety valve 5 is constituted by an elastomeric sleeve, or by any valve that can be actuated by means of an actuator.

An actuator 51 mounted on the body 10 makes it possible to open or close the safety valve 5. This actuator 51 has a first configuration in which the safety valve 5 is in the open configuration, and a second configuration in which the safety valve 5 is in the closed configuration; the actuator 51 thus forms a mirror element of the safety valve 5, insofar as the configuration of the actuator 51 reflects the configuration of the safety valve 5.

In the example shown in FIGS. 2 and 3, the actuator 51 comprises a lever that is attached in a rotationally fixed manner to the stopper of the valve 5. Alternatively, the actuator 51 is instantiated by any other type of actuator connected to the safety valve 5 by means of a direct or indirect mechanical link; other examples of actuators 51 thus include a push button, a lever mechanism, a butterfly valve, and a flat screw.

The valve support 4 is secured to the feed module 2 independently of the attachment module 3. It can be optionally detached from the feed module 2 and, in this case, has its own system (not shown) for attachment to the feed module 2 independently of the coupling system 30. To simplify the explanation of this example, it will be assumed here that the valve support 4 is fixedly mounted on the supply module 2.

The attachment module 3 is interchangeable at the edge of the production line in order to enable the use of a coupling module 3 that is compatible with the end piece of the fluid circuit to be filled (not shown). According to the invention, the attachment module 3 is composed of several parts that are assembled and held together to form the attachment module 3, thus facilitating handling thereof.

The coupling system 30 has a coupled position, in which the coupling system 30 establishes a tight connection between the body 10 and the attachment module 3, and an uncoupled position, in which the coupling system 30 enables the separation of the attachment module 3 with respect to the body 10.

For this purpose, in the examples illustrated in FIGS. 2 to 5, the coupling system 30 comprises a system of three CHC-type screws 32 on the upper face of the attachment module 3, with each screw 32 comprising a threaded rod that is engaged partially in the upper portion of the attachment module 3 and a head that extends out of the attachment module 3, and three holes 31 (FIG. 4) that are arranged in the form of keyholes in the lower portion of the body 10, with each keyhole 31 comprising a wide portion having a greater section than the section of the screw heads 32 and a narrow portion having a section that is between the section of the screw heads 32 and the section of the screw rods 32. The attachment module 3 is then designed to pivot slightly relative to the feed module 2 so as to enable the screws 32 to slide from the wide portion to the narrow portion of the keyholes 31. Windows 61 are also formed in the body 10 so as to enable an operator to access the screw heads 32 when they are engaged in the narrow portion of the keyholes 31, so that the operator can complete the coupling by tightening the three screws 32 with a dedicated tool. This locking operation is intended to keep the modules in position and to seal, by compression, the O-rings that are present between the body 10 and the attachment module 3.

It will readily be understood that this exemplary composition of the coupling system 30 is not limitative, because the coupling system 30 is any system that enables the position of the feed module 2 and attachment module 3 to be maintained, thus ensuring a tight connection.

The adapter 1 further comprises a safety device 6, preferably in a single piece, that can be moved between a locked position, in which the safety device 6 locks the coupling system 30 in the coupled position, and an unlocked position, in which the safety device 6 enables the coupling system 30 to be moved into the uncoupled position. For this purpose, in the exemplary embodiment shown in FIGS. 2 and 3, the safety device 6 comprises a cover 60 in the form of a pivoting ring that is carried by the body 10 and positioned at the junction between the body 10 and the attachment module 3. The cover 60 comprises recesses 61 that give the operator access to the screws 32 when the cover 60 is turned to the unlocked position (FIG. 3) and blocks the operator from accessing the screws 32 when the cover 60 is turned to the locked position (FIG. 2).

The safety device 6 also cooperates with the actuator 51 of the safety valve 5 so as to enable the actuator 51 to be in its first configuration when the safety device 6 is in the locked position, and to force the actuator 51 to be in its second configuration when the safety device 6 is moved from its locked position to its unlocked position.

In the example shown in FIGS. 2 and 3, the actuator 51 is self-closing, meaning that it is subjected to the force of a return member, for example a spring, that is designed to automatically return the actuator 51 to its second configuration for closing the safety valve 5. The safety device 6 then comprises a lock pin 62 that is attached to the cover 60 and acts on the handle of the actuator 51 when the safety device 6 is in the locked position so as to maintain the actuator 51 in its first configuration, which opens the safety valve 5 (FIG. 2) of the fluid conduit 221. Since the lock pin 62 can be moved together with the cover 60, it does not block the actuator 51 when the safety device 6 is in the unlocked position, so that the actuator 51 is then automatically returned to the closed configuration of the valve 5 by the return member when the safety device 6 is in the unlocked position.

Alternatively, the actuator 51 is manually operable, meaning that it can be freely moved between its first and second configurations and is not subjected to the force of a return member. The safety device 6 then still comprises a lock pin 62 that is attached to the cover 60; however, it is not positioned so as to maintain the actuator 51 in its first configuration, but rather such that the actuator 51, when in its first configuration, obstructs the movement of the lock pin 62 between the locked and unlocked positions of the safety device 6. The operator is thus forced to move the actuator 51 into its second, closed configuration of the valve 5 when it wishes to move the safety device 6 to its unlocked position, which makes it possible to guarantee the safety of the use of the filling adapter 1.

The lock pin 62 has been described here as being integral with the cover 60; alternatively, the lock pin 62 is a simple appendage that cooperates with the actuator 51.

A method for uncoupling the attachment module 3 from the body 10 will now be described.

The attachment module 3 is first coupled with the body 10 and the safety device 6 is positioned in the locking position, as shown in FIG. 2.

The operator then turns the cover 60 in order to position the recesses 61 in front of the screw heads 32. In this position, the lock pin 62 on the cover 60 no longer exerts any force on the actuator 51, and the latter changes position under the effect of the return member, causing the safety valve 5 to close. The fluid connection 221 is now closed by the safety valve 5.

The operator then unscrews the screws 32 in order to loosen the joints of the attachment module 3, then pivots the attachment module 3 slightly so as to remove the screw heads 32 from the keyholes 31, with the screws 32 remaining secured to the attachment module 3. The attachment module 3 can thus be uncoupled from the body 10.

Figure 4:
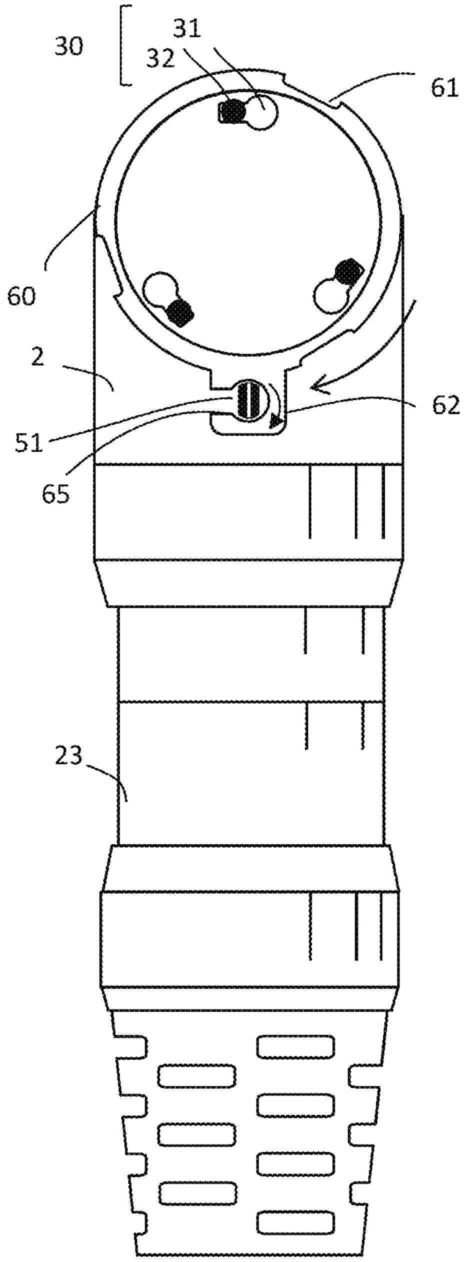
FIG. 4 is a view from below of the filling adapter according to a second embodiment of the invention, with the filling adapter being in the coupled and locked position.
Figure 5:
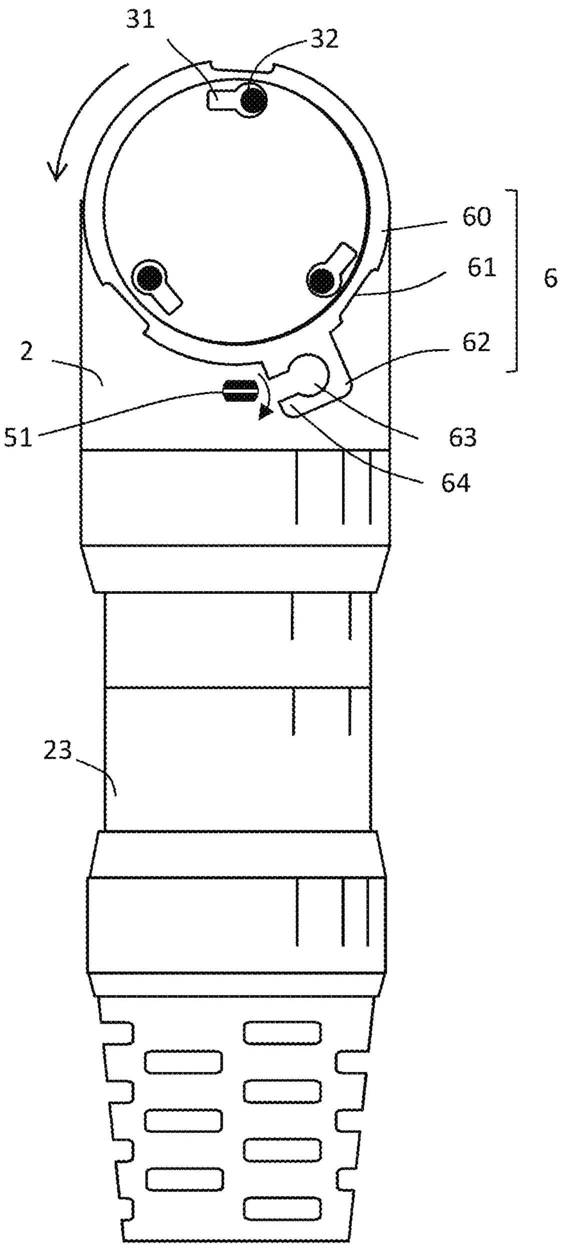
FIG. 5 shows a view similar to that of FIG. 4, but with the filling adapter being in the unlocked and uncoupled position.

FIGS. 4 and 5 show a second exemplary embodiment of the filling adapter 1 according to the invention. Only the differences from the filling adapter 1 described above with reference to FIGS. 2 and 3 will be described in detail below with reference to FIGS. 4 and 5.

In this second exemplary embodiment of the adapter 1, the actuator 51 is manual. It actuates the safety valve 5 by a quarter turn and has two parallel flat surfaces.

The safety device 6 still comprises a cover 60 in which recesses 61 are formed, and a lock pin 62 that is attached to the cover 60. Unlike the first embodiment, the lock pin 62 has a cavity 63 for receiving the actuator 51 when the safety device 6 is in the locked position. This cavity 63 is designed to enable the actuator 51 to be pivoted by a quarter-turn about its axis of rotation when it is received in the cavity 63. The cavity 63 has a wall 64 that is designed to retain the actuator 51 in the cavity 63 when in its first configuration. An opening 65 is disposed in the wall 64, with this opening 65 being designed to allow the actuator 51 to pass through the wall 64 when in its second configuration. The operator is thus forced to close the safety valve 5 in order to be able to move the safety device 6 from its locked position to its unlocked position.

In FIG. 4, the safety device 6 is in the locked position. The cover 60 is then positioned so as to conceal the fastening screws 32, meaning that the recesses 61 do not allow the operator to have access to the screw heads 32. The actuator 51 is in the closed position and locks the safety device 6 in the locked position. In this position, the safety valve 5 is open and the attachment module 3, not visible in this figure, is coupled with the feed module 2.

In FIG. 5, the operator has turned the actuator 51 by a quarter-turn, thus closing the safety valve 5. This position of the actuator 51 unlocks the safety device 6, which can then be moved to its unlocked position. The operator then turns the cover 60 in order to have access to the screw heads 32 and can thus loosen them with a suitable tool in order to be able to disconnect them from the keyholes 31 by means of a slight rotation of the attachment module 3.

Figure 6:
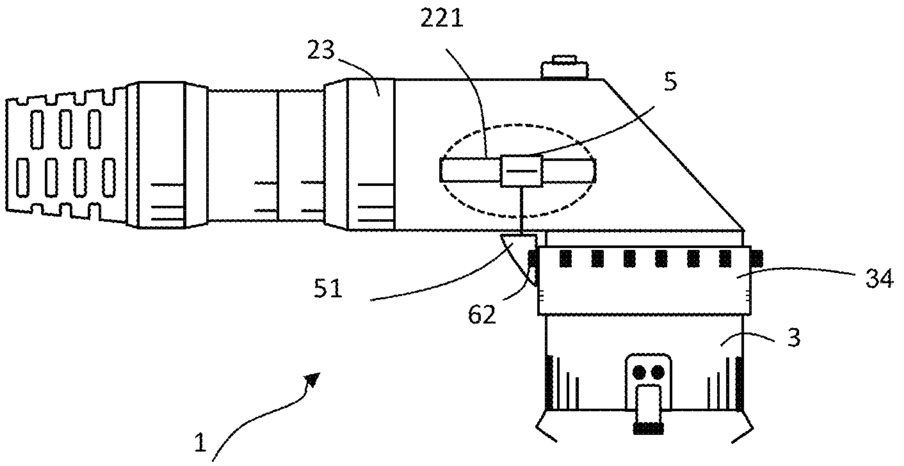
FIG. 6 is a profile view of a filling adapter according to a first embodiment of the invention, with the filling adapter being in the coupled and locked position.
Figure 7:
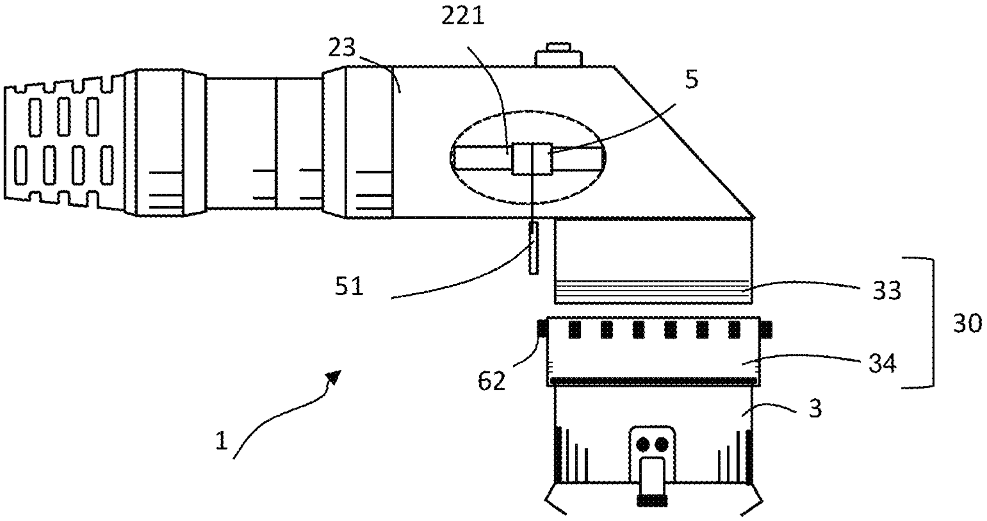
FIG. 7 shows a view similar to that of FIG. 6, but with the filling adapter being in the unlocked position.

FIGS. 6 and 7 show a third embodiment of the adapter 1 according to the invention. Only the differences from the filling adapter 1 described above with reference to FIGS. 2 and 3 will be described in detail below with reference to FIGS. 6 and 7.

In this third exemplary embodiment of the invention, the coupling system 30 is integral with the attachment module 3. This example does not constitute a limitation, since the coupling system 30 can also be positioned on the body 10.

In this example, the coupling system 30 comprises a ring 31 provided with an internal thread rotating around the attachment module 3 and cooperating with a screw furrow or thread 32 on the body 10. This ring 31 is screwed onto the thread 32 of the body 10 and enables the coupling module 3 to be coupled with the body 10. The tightening of the ring 31 enables the seals to be compressed between the body 10 and the module 3. The uncoupling of the attachment module 3 is just as simple, since it is sufficient for the operator to unscrew the ring 31 from the feed module 2 in order to uncouple the attachment module 3.

In this third exemplary embodiment, the ring 31 also constitutes the safety device 6. For this purpose, the ring 31 comprises at least one lock pin (a plurality of lock pins 62 in the depicted example). In the example shown, the actuator 51 is self-closing, and the lock pin 62 is designed to act on the actuator 51 when the safety device 6 is in the locked position so as to maintain the actuator 51 in its first configuration for opening the safety valve 5; the safety valve 5 is then closed automatically during the uncoupling of the attachment module 3, with the lock pin 62 no longer holding the actuator 51 in its first configuration. In a variant (not shown), the actuator 51 is manually operated, and the lock pin 62 is then positioned such that the actuator 51, when in its first configuration, hinders the movement of the lock pin 62 between the locked and unlocked positions of the safety device 6; for the uncoupling, the operator is thus forced to actuate the actuator 51 in order to move the safety valve 5 to the closed position and enable the lock pin 62 on the ring 31 to be moved.

In another variant of this third exemplary embodiment of the invention (not shown), the actuator 51 does not comprise a rotary handle but rather is constituted by a push button that is pressed by the ring 31 when the coupling system 30 is in the coupled position and released when the ring 31 is unscrewed. The actuator 51 thus closes the safety valve 5 at the moment when the ring 31 begins to be unscrewed. In this variant, the safety device 6 may or may not comprise a lock pin 62.

By virtue of the invention described above, the operator does not have to ensure that the safety valve 5 is closed before initiating operations for uncoupling the attachment module 3; the safety valve 5 will indeed necessarily be in the closed position when the operator wishes to uncouple the attachment module 3, since the operator must have previously performed an action (moving the safety device 6 to its unlocking position or moving the actuator 51 toward its second configuration in order to be able to move the safety device 6) that will have brought about the closing of the safety valve 5; the uncoupling of the attachment module 3 can thus be performed safely.

What is claimed is:

1. An adapter for testing or filling a container to be filled with fluid, particularly for an initial filling on an automobile production line, said adapter being composed of a body, an attachment module for attaching the adapter to the container to be filled, and a coupling system having a coupled position, in which a sealed connection is established between the body and the attachment module, and an uncoupled position, in which the attachment module can be separated from the body, with the body including a feed module comprising a plurality of conduits that include at least one fluid conduit, said fluid conduit being equipped with a safety valve that can be moved between an open configuration in which the safety valve permits the circulation of fluid in the fluid conduit and a closed configuration in which the safety valve prevents the circulation of fluid in the fluid conduit, with the safety valve being connected to a mirror element, said mirror element having a first configuration in which the safety valve is in the open configuration and a second configuration in which the safety valve is in the closed configuration, wherein the adapter comprises at least one safety device that cooperates with the coupling system, said safety device being movable between a locked position, in which the safety device locks the coupling system in the coupled position, and an unlocked position, in which the safety device allows the displacement of the coupling system to the uncoupled position, with the safety device also cooperating with the mirror element so as to enable the mirror element to be in its first configuration when the safety device is in the locked position, and forcing the mirror element to be in its second configuration when the safety device is moved from its locked position to its unlocked position.

2. The adapter according to claim 1, wherein the mirror element is designed to lock the safety device in the locked position when in its first configuration and to enable the safety device to be moved from its locked position to its unlocked position when it is in its second configuration.

3. The adapter according to claim 1, comprising a biasing device biasing the mirror element toward its second configuration, the safety device being designed to maintain the mirror element in its first configuration when in the locked position.

4. The adapter according to claim 1, wherein the safety device comprises a cover that is designed to block user access to the coupling system when the safety device is in the locked position.

5. The adapter according to claim 4, wherein the cover is an openwork ring pivoting on one or other of the body and the attachment module and preventing user access to the coupling system when the safety device is in the locked position.

6. The adapter according to claim 5, wherein the mirror element is designed to lock the safety device in the locked position when in its first configuration and to enable the safety device to be moved from its locked position to its unlocked position when it is in its second configuration, and the safety device comprises a lock pin that is secured to the cover, with the mirror element being designed to lock the lock pin in order to keep the safety device in the locked position when the safety valve is open.

7. The adapter according to claim 1, wherein the coupling system comprises screws secured to the attachment module and holes arranged in the form of keyholes in the body, with each screw comprising a threaded rod that is engaged in part in the attachment module and a head extending out of the attachment module, and with each hole comprising a wide portion having a section that is greater than the section of the screw heads and a narrow portion having a section that is between the section of the screw heads and the section of the screw rods.

8. The adapter according to claim 1, wherein the coupling system comprises a ring that is disposed on the body or on the attachment module, and a screw thread that is disposed on the opposing module, with the ring having an internal thread that is designed to cooperate with the screw thread in order to enable the ring to be screwed onto the screw thread.

9. The adapter according to claim 1, wherein the mirror element comprises an actuator for actuating the safety valve, the actuator being able to be moved between a first, open position of the safety valve and a second, closed position of the safety valve, with the mirror element being in its first configuration when the actuator is in its first position and in its second position when the actuator is in its closed position.

* * * * *